United States Patent
Kurusu et al.

(10) Patent No.: US 7,164,831 B2
(45) Date of Patent: *Jan. 16, 2007

(54) OPTICAL FIBER, EVALUATION AND FABRICATION METHOD THEREOF

(75) Inventors: Kazuhiko Kurusu, Tokyo (JP); Hideya Moridaira, Tokyo (JP); Yoshinori Ishida, Tokyo (JP)

(73) Assignee: The Furukawa Electric Co., Ltd., Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 11/178,353

(22) Filed: Jul. 12, 2005

(65) Prior Publication Data

US 2006/0013546 A1  Jan. 19, 2006

(30) Foreign Application Priority Data

Jul. 16, 2004  (JP)  ............... 2004-210097

(51) Int. Cl.
*G02B 6/02*  (2006.01)

(52) U.S. Cl. .................. 385/123; 65/385

(58) Field of Classification Search .......... None
See application file for complete search history.

(56) References Cited

U.S. PATENT DOCUMENTS 6,131,415 A  10/2000  Chang et al.
6,944,381 B1*  9/2005  Kurusu et al. ............. 385/123

2005/0220430 A1*  10/2005  Kurusu et al. ............. 385/123

FOREIGN PATENT DOCUMENTS

JP  3301602  4/2002
JP  2004-109124  4/2004

OTHER PUBLICATIONS

Y. Namihira, "Loss Increase Phenomenon and Long Time Reliability of Undersea Cable" Nikkei Electronics., 1984, 12.3, pp. 233-248 (with English extracted translation).
K. H. Chang, et al., "New Hydrogen Aging Loss Mechanism in the 1400 nm Window" Feb. 21-26, 1999, pp. PD 22-1 to PD 22-3.

(Continued)

*Primary Examiner*—Michelle Connelly-Cushwa
(74) *Attorney, Agent, or Firm*—Oblon, Spivak, McClelland, Maier & Neustadt, P.C.

(57) ABSTRACT

An optical fiber having a small increase in loss at a wavelength of approximately 1400 nm involved in a deuterium treatment is provided, and an evaluation method to decide whether an optical fiber is that having such a loss increase, and a fabrication method of an optical fiber having a small increase in such a loss are also provided. An optical fiber according to the present invention comprises a core composed of a silica glass doped with at least germanium and a cladding composed of a silica glass surrounding it. The optical fiber is exposed to an atmosphere containing hydrogen or deuterium to diffuse hydrogen molecules or deuterium molecules in the optical fiber, and after that, the outer periphery of the glass region of the optical fiber is etched to an outer diameter of 50 μm, and then the electron spin density of PORs is $1 \times 10^{13}$ spins/g or less when the glass region is measured by the electron-spin resonance method.

9 Claims, 3 Drawing Sheets

OTHER PUBLICATIONS

H. Hanabusa, "Characterization of Defects in Optical Fiber", CERAMICS, No. 9, 21(1986), pp. 244-252 (with English extracted Translation, and with a related article (ref. AX by Y. Hibino, et al.).

Yoshinori Hibino, et al., "Defect Structure and formation mechanism of drawing-induced absorption at 630 nm in silica optical fibers". J. Appl. Phys. 60 (5), Sep. 1, 1986, pp. 1797-1801.

Y. Hama, et a., "ESR Seeds generated in Silica-Optical Fiber and Light Absorption Band." Nippon Electronics News, vol. 29, No. 2. 27, (1989), pp. 7-10, with English extracted Translation.

* cited by examiner

OPTICAL FIBER, EVALUATION AND FABRICATION METHOD THEREOF

BACKGROUND OF THE INVENTION

1. Field of the Invention

The present invention relates to a single mode optical fiber which has high reliability of a hydrogen-proof characteristic and is suitable for wavelength division multiplexing (WDM) transmission in 1310 nm to 1625 nm, a method of evaluating whether an optical fiber is of that sort, and a method of fabricating such an optical fiber.

2. Related Background Art

Much development has been conducted on optical fibers used for WDM transmission. At first, development of optical fibers was focused on a 1.55-μm band (e.g., in the wavelength range of 1535 to 1570 nm), in which the transmission loss of an optical fiber composed of a silica glass becomes a minimum; at present, studies to broaden the wavelength range for use to 1310 nm through 1625 nm are being conducted.

On the other hand, since a conventional optical fiber is often contaminated with OH groups as an impurity, which has an absorption peak at the wavelength of approximately 1385 nm, transmission in the vicinity of this wavelength is difficult. Therefore, for broadening the wavelength range of WDM transmission to 1310 nm through 1625 nm, those absorption losses must be made to be as small as possible. Japanese Patent No. 3301602 discloses an optical fiber having a low loss at 1385 nm, and its fabrication method.

Now, it is known that there is a phenomenon that the transmission loss also increases when hydrogen diffuses into an optical fiber. One cause of the increase in the transmission loss due to hydrogen is considered to be a following mechanism (Namihira, NIKKEI ELECTRONICS, 1984. 12. 3, PP. 233–248, K. H. Chang et al, Feb. 21–26, 1999, OFC/IOOC'99).

The core of an optical fiber is generally doped with germanium, and has a higher refractive index than that of the surrounding cladding. In a drawing process of an optical fiber being drawn from an optical fiber preform, the optical fiber preform is exposed to a high temperature and a high tension, and is rapidly cooled with glass structures broken. Hence, structural defects as indicated by the formula (1) are considered to be generated in the core.

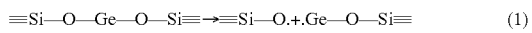  (1)

That is, bonds of Ge—O with a weak bonding strength are broken to form non-bridging oxygen hole centers (NBOHC; ≡Si—O.) that are one type of paramagnetic defects, and Ge—E' (.Ge≡). Diffusion of hydrogen into the optical fiber brings about a reaction of the NBOHC and hydrogen, causing the increase in the transmission loss. Specifically, a reaction indicated by the formula (2) forms OH groups, which involves an increase in the absorption loss. This reaction is known to occur at room temperature.

  (2)

The density of the residual NBOHC in the optical fiber is known to depend largely on the cooling rate at drawing. A higher cooling rate is prone to the more residues. Hanabusa, Ceramics, 21 (1984), No. 9, pp. 244–252 discloses that the density of the paramagnetic defects can be observed by the electron-spin resonance (ESR) method. US Patent Publication No. 20040475764 shows that the electron spin density of NBOHC is measured by ESR method, and the hydrogen resistance of an optical fiber is evaluated based on the obtained values.

Methods of decreasing the NBOHC density in an optical fiber to suppress the transmission loss deterioration includes one in which an optical fiber during or after drawing is exposed to an atmosphere containing hydrogen or deuterium.

However, the hydrogen treatment of exposing an optical fiber to an atmosphere containing hydrogen is not preferable because the increase in the transmission loss occurs due to formation of OH groups although NBOHC vanishes as shown by the formula (2). On the other hand, the deuterium treatment using deuterium instead of hydrogen brings about a reaction indicated by the formula (3) in an optical fiber.

  (3)

That is, since the deuterium treatment forms OD groups, the absorption due to OH groups does not occur. Since the OD groups do not have a large absorption peak in 1310 nm to 1625 nm, the transmission loss in the wavelength range is little affected. Therefore, the deuterium treatment of an optical fiber is an effective means to improve the hydrogen-proof characteristic of the optical fiber.

213 Incidentally, although a deuterium-treated fiber is supposed to cause no transmission loss at approximately 1385 nm due to OH groups even if it is exposed to hydrogen after the treatment, the transmission loss at the wavelength of approximately 1400 nm increases at times as shown in FIG. 3. FIG. 4 shows changes with lapse time of the transmission losses at the wavelength of 1400 nm after a deuterium treatment recited in the embodiments of the present invention. The absorption peak is unstable and prone to decrease with lapse time; however, the observation in a very long lapse time is needed for guaranteeing the fiber quality, thus presenting a great obstacle to fabricating an optical fiber. Therefore, when the deuterium treatment is conducted, it is desirable that the increase in the transmission loss at the wavelength of approximately 1400 nm do not occur.

An object of the present invention is to provide an optical fiber with a small increase in the loss at the wavelength of approximately 1400 nm involved in a deuterium treatment. Further, an object of the present invention is to provide a method of evaluating whether or not an optical fiber is that generating an increase in such loss, and a method of fabricating an optical fiber with a small increase in such loss.

SUMMARY OF THE INVENTION

For solving the above problems, the present invention provides a method of evaluating whether or not an optical fiber exposed to deuterium presents a remarkable transmission loss, a fabrication method in which the evaluation result is utilized for optimizing the fabrication conditions of an optical fiber, and a single mode optical fiber which is excellent in the hydrogen-proof characteristic and used for broad band WDM transmission.

An optical fiber according to the present invention comprises a core composed of a silica glass doped with at least germanium, and a cladding composed of a silica glass surrounding the core. The optical fiber is exposed to an atmosphere containing hydrogen or deuterium to diffuse hydrogen molecules or deuterium molecules in the fiber, and after that, the outer periphery of the glass region of the optical fiber is etched to an outer diameter of approximately 50 μm. The electron spin density of per-oxy radicals (POR) is $1 \times 10^{13}$ spins/g or less when the glass region is measured by ESR.

An optical fiber according to the present invention is characterized in that: the optical fiber comprises a core composed of a silica glass doped with at least germanium, and a cladding composed of a silica glass surrounding it; the cutoff wavelength λcc is 1310 nm or less; when an optical fiber is exposed to an atmosphere containing hydrogen of a partial pressure of approximately 0.01 atm at room temperature, kept in the state of being exposed until the transmission loss at a wavelength of 1240 nm increases by 0.03 dB/km or more in comparison to that prior to the exposure, then taken out into the air, left for 14 or more days, a transmission loss at wavelengths of 1310 to 1625 nm is 0.40 dB/km or less; and after the outer periphery of the glass region of the optical fiber is etched to an outer diameter of approximately 50 μm, the electron spin density of POR is $1 \times 10^{13}$ spins/g or less when the glass region is measured by ESR.

An optical fiber according to the present invention is further characterized in that after the outer periphery of the glass region of the optical fiber is etched to an outer diameter of approximately 50 μm with a diluted hydrofluoric acid, a signal corresponding to Ge(H)-E' or Ge(D)-E' is detected when the glass region is measured by ESR.

A method of fabricating an optical fiber according to the present invention comprises the steps of; preparing an optical fiber perform; drawing the optical fiber preform to form an optical fiber composed of a core composed of a silica glass doped with at least germanium, and a cladding composed of a silica glass surrounding it; and conducting a hydrogen treatment or a deuterium treatment to diffuse hydrogen molecules or deuterium molecules in the optical fiber by exposing the optical fiber to an atmosphere containing hydrogen or deuterium, wherein a cooling rate, a drawing furnace temperature and a drawing speed in the drawing step are selected such that an increase in the electron spin density of PORs in the optical fiber measured by ESR after the hydrogen treatment or the deuterium treatment in comparison to that before the hydrogen or deuterium treatment is $1 \times 10^{13}$ spins/g or less.

Further, the present invention provide a method for evaluating the hydrogen resistance of an optical fiber obtained by drawing an optical fiber preform to form an optical fiber comprising a core of a silica glass doped with at least germanium and a cladding of a silica glass surrounding it, and treating the optical fiber with hydrogen or deuterium to diffuse hydrogen molecules or deuterium molecules in the optical fiber by exposing the optical fiber to an atmosphere containing hydrogen or deuterium. The evaluation method is to evaluate the hydrogen-proof characteristic of the optical fiber by evaluating an increased amount in an electron spin density in the optical fiber after the hydrogen treatment or the deuterium treatment in comparison to that before the hydrogen or deuterium treatment by measuring the glass regions of the optical fibers before and after the hydrogen or deuterium treatment by ESR for the electron spin densities of PORs.

DESCRIPTION OF THE PREFERRED EMBODIMENTS

EXAMPLES

Hereinafter, the present invention will be illustrated by way of examples.

A. Fabrication of an Optical Fiber

1. An Optical Fiber for a Fabrication Object

Figure 1A:
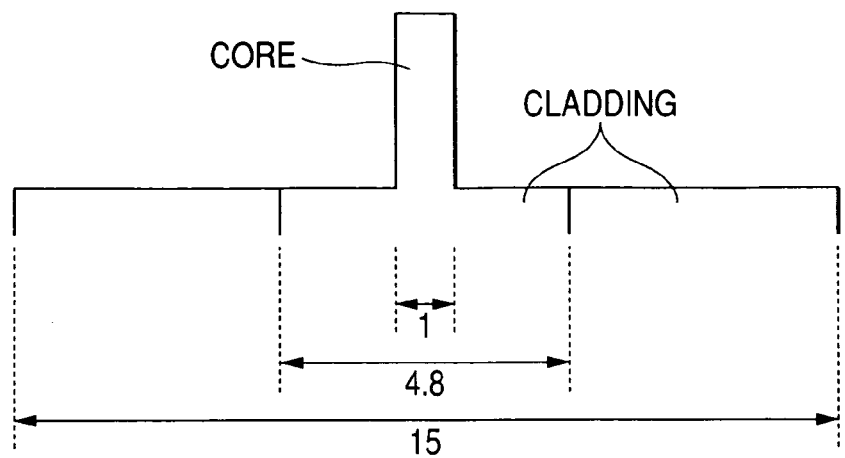
FIG. 1(A) is a diagram showing a refractive index profile of an optical fiber recited in the embodiments of the present invention.
Figure 1B:
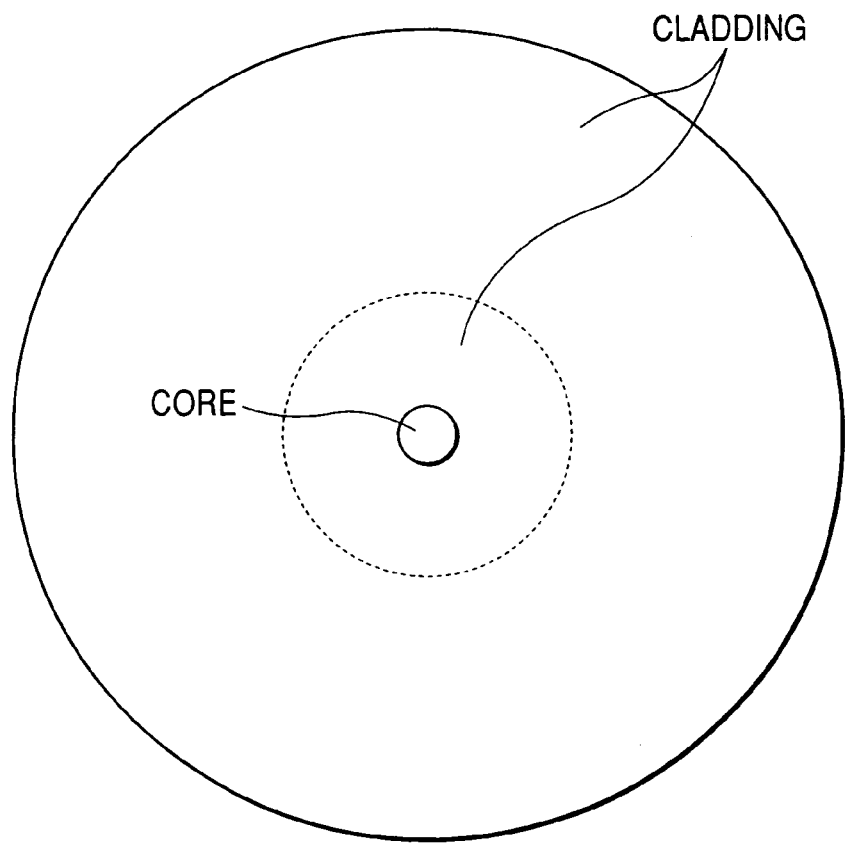
FIG. 1(B) is a diagram showing a cross-section of the optical fiber.

An optical fiber according to the present invention may have various refractive index profiles. However, for illustrating the gist of the present invention as simply as possible, the examples employed a single mode fiber (SMF) having a zero dispersion wavelength in a 1.3-μm band as a production kind, and a most common refractive index profile of a step index fiber in which a core is covered with a cladding as shown in FIG. 1(A). The diameter of the cladding was the most common at approximately 125 μm, and that of the core was approximately 8.3 μm.

2. Fabrication of an Optical Fiber Preform

Figure 2:
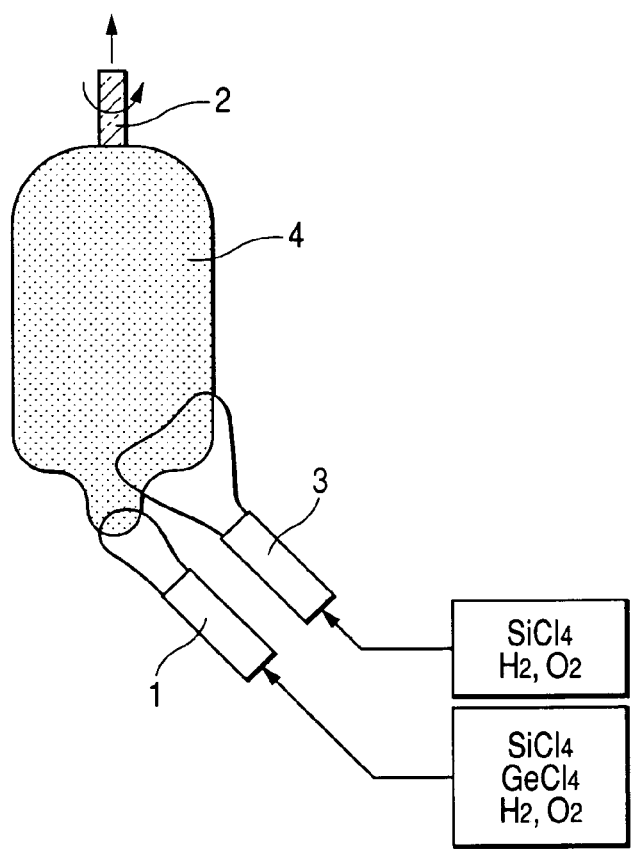
FIG. 2 is a diagram showing a state of fabricating an optical fiber preform by VAD.
Figure 3:
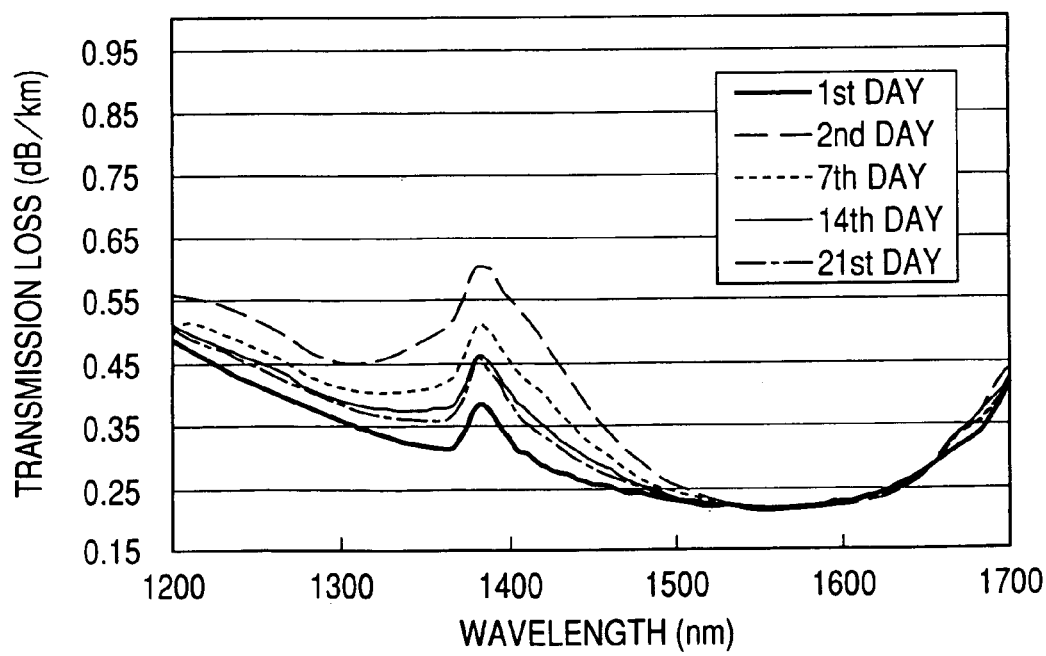
FIG. 3 is a diagram exemplifying transmission losses of a fiber conventionally treated with deuterium.

An optical fiber preform was fabricated by vapor-phase axial deposition (VAD) method as shown in FIG. 2. A porous preform 4 was formed on a rotating target rod 2 by blowing a soot from a hydrolysis burner 1 for forming a silica glass core part containing Ge while blowing a soot from a hydrolysis burner 3 for forming a silica glass cladding part.

Next, the porous preform 4 was dehydrated and sintered and a vitreous glass rod was fabricated (hereinafter, referred to as core rod). The obtained core rod had an outer diameter ratio of the cladding to the core (hereinafter, referred to as cladding/core ratio) of 4.8/1 as shown in FIG. 1(A). Here, the outer diameter of the core in the present specification should be construed to refer to a diameter of a portion having half a maximum of relative refractive index differences of the core with the cladding.

Then, the core rod was heated and elongated to an outer diameter of approximately 25 mm. A soot of silica glass was deposited to a desired thickness on the outer periphery of the elongated core rod by using the outside vapor-phase deposition method, and dehydrated and sintered to fabricate an optical fiber preform having the refractive index profile shown in FIG. 1(A). The optical fiber preform had a cladding/core ratio of approximately 15/1.

3. Drawing of the Optical Fiber Preform

Then, an optical fiber was fabricated by drawing the optical fiber preform. In the examples, the optical fiber preform was drawn under the following two conditions to obtain two kinds of optical fiber samples.

Condition 1: drawing furnace temperature 1950° C.; drawing speed 500 m/min.

Condition 2: drawing furnace temperature 2050° C.; drawing speed 1200 m/min.

B. Characteristics Examination of the Optical Fiber

1. Measurements of Transmission Characteristics

The SMFs fabricated under the above two levels of drawing conditions were each measured for the cutoff wavelength λcc, and the transmission loss before and after the hydrogen exposure for knowing the hydrogen-proof characteristic. The measured results are shown in Table 1. Here, SMF(1) denotes an optical fiber drawn under the condition 1; and SMF(2) denotes an optical fiber drawn under the condition 2. The transmission losses at wavelengths of 1310 nm and 1385 nm measured before the hydrogen exposure are shown as 'before hydrogen exposure (a)'.

TABLE 1

| | | | Transmission loss (dB/km) | | | | | |
|---|---|---|---|---|---|---|---|---|
| | | | Before hydrogen exposure (a) Measuring wavelength (nm) | | After hydrogen exposure (b) Measuring wavelength (nm) | | Transmission loss change (b − a) Measuring wavelength (nm) | |
| | Drawing condition | Cut-off wave length (nm) | 1310 | 1385 | 1310 | 1385 | 1310 | 1385 |
| SMF (1) | Condition 1 | 1165 | 0.327 | 0.308 | 0.330 | 0.345 | 0.003 | 0.037 |
| SMF (2) | Condition 2 | 1203 | 0.349 | 0.315 | 0.377 | 0.997 | 0.028 | 0.662 |

Either of the optical fibers of the examples has a cutoff wavelength of 1310 nm or less, thereby guaranteeing the single mode operation in the wavelength range of not more than 1310 nm. Note that the herein recited 'cutoff wavelength' is the cable cutoff wavelength $\lambda cc$ defined in the standard ITU-T G.650.1. Note that, in the present specification, the various characteristics of optical fibers follow the definitions specified in ITU-T G.650.1 as long as not specified otherwise. Either of the optical fibers of the examples has a loss at 1385 nm of 0.40 dB/km or less, thereby showing an optical fiber of a sufficiently small OH absorption loss.

2. Hydrogen-proof Characteristic Examinations of the Optical Fibers

Then, the samples were exposed to hydrogen. Here, the hydrogen exposure condition was that specified in IEC60793-2 B1.3. That is, the optical fibers were exposed to a hydrogen atmosphere of a hydrogen partial pressure of 0.01 atm at room temperature, and kept in the state of being exposed to hydrogen until the transmission loss at a wavelength of 1240 nm increases by 0.03 dB/km in comparison to the transmission loss before the hydrogen exposure (the initial value). After that, they were taken out in the air, left for 14 or more days, and measured for the transmission loss.

Transmission losses after the hydrogen exposure and transmission loss changes (b-a) through the hydrogen exposure are shown in Table 1. SMF(2) exhibits a remarkable increase in the OH absorption loss at a wavelength of approximately 1385 nm after the hydrogen exposure; by contrast, SMF(1) exhibits a small increase in the loss, and realized a transmission loss (b) at a wavelength of 1385 nm of not more than 0.40 dB/km after the hydrogen exposure, making itself an optical fiber suitable for broad band WDM transmission.

3. Changes in the Transmission Losses Through a Deuterium Treatment

SMF(1) and SMF(2) were treated with deuterium, and the transmission loss behavior after that was observed. The deuterium treatment was to expose them at room temperature to a deuterium atmosphere of approximately 1 atm and 100% for two hours and to leave them in the air. Changes with lapse time of the transmission losses at a wavelength of 1400 nm were continuously measured right after they were taken out in the air after their exposure to deuterium had been finished, on the basis of the transmission losses at the same wavelength of 1400 nm measured before the deuterium treatment.

Figure 4:
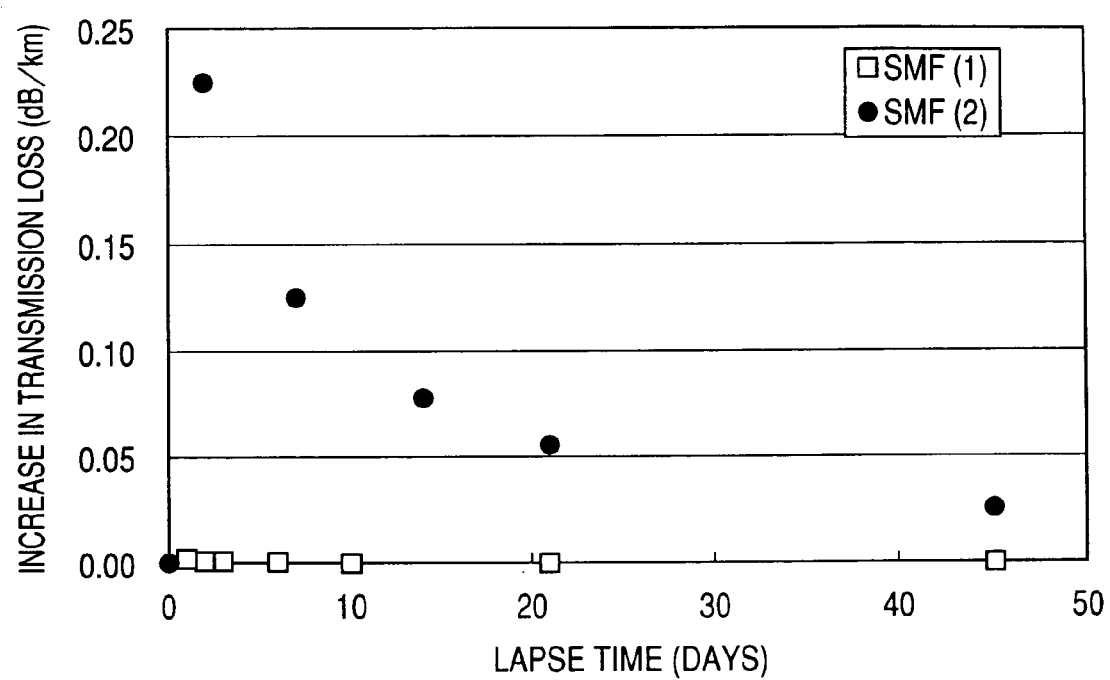
FIG. 4 is a diagram showing changes with lapse time in transmission losses at a wavelength of 1400 nm of optical fibers after a deuterium treatment recited in the embodiments of the present invention.

The measured results are shown in FIG. 4. For SMF(1), an increase from the transmission loss as the basis is small. By contrast, SMF(2) exhibits a large increase in the transmission loss of 0.2 dB/km or more, and an increase in the transmission loss of 0.05 dB/km or more still even after being left in the air for 20 or more days.

4. Measurements of Paramagnetic Defects

A coating was removed from each of SMF(1) and SMF(2) using a diluted sulfuric acid. The obtained bare optical fibers were further immersed in a diluted hydrofluoric acid, and etched to an outer diameter of about 50 μm (50±5 μm).

The reason the outer diameter was made to be about 50 μm is to identify structural defects in the mode field diameter (MFD) as correctly as possible. However, if the outer diameter is made to be less than about 50 μm, an optical fiber become very difficult to handle in measuring by ESR, so the outer diameter was set to be the outer diameter above. Then, each optical fiber was measured by ESR for the density of paramagnetic defects. The results are shown in Table 2.

TABLE 2

| | | | unit: spins/g | | | | | |
|---|---|---|---|---|---|---|---|---|
| Sample name | Deuterium treatment | Hydrogen treatment | Si-E' | Ge-E' | Ge(D)-E' | Ge(H)-E' | NBOHC | POR |
| SMF (1) | | | $3.0 \times 10^{13}$ | $2.7 \times 10^{14}$ | | | | |
| | ○ | | | $3.5 \times 10^{14}$ | $3.8 \times 10^{13}$ | | | |
| | | ○ | | $6.0 \times 10^{14}$ | | $3.7 \times 10^{13}$ | | |
| SMF (2) | | | | $3.0 \times 10^{14}$ | | | $1.1 \times 10^{14}$ | |
| | ○ | | | $4.5 \times 10^{14}$ | $1.6 \times 10^{14}$ | | | $2.4 \times 10^{13}$ |
| | | ○ | | $7.1 \times 10^{14}$ | | $1.5 \times 10^{14}$ | | $3.2 \times 10^{13}$ |

In Table 2, open circle marks in the columns of 'deuterium treatment' and 'hydrogen treatment' denote that the samples were exposed to an atmosphere containing hydrogen or deuterium before ESR measurement. The hydrogen exposure condition was that described in the aforesaid IEC60793-2 B1.3. The deuterium exposure condition was the aforesaid one; that is, the sample was exposed at room temperature to a deuterium atmosphere of approximately 1 atm and 100% for two hours, and left in the air. The important point here is whether hydrogen or deuterium diffuses sufficiently into the fiberglass, and reacts sufficiently with the structural defects of fiberglass. Therefore, the exposure condition need not be limited to these ones.

The blank spaces in Table 2 indicate that the ESR measurement results are lower than the detection limit, which is $1 \times 10^{12}$ spins/g in the examples.

In Table 2, comparing the densities of NBOHC in the samples not exposed to hydrogen or deuterium, NBOHC is detected from SMF(2), but not from SMF(1). This is considered to be because since the cooling rate of the fibers increased as the drawing furnace temperature and the drawing speed increased, NBOHC was prone to remain.

The embodiments show the case where parameters of drawing conditions only are drawing furnace temperature and drawing speed, but drawing conditions are not limited to those, and include other adjustable factors all. Besides, optimal values of the drawing conditions cannot definitely be fixed depending on the differences of drawing machines.

Next, comparing the samples treated with hydrogen or deuterium, it can be seen that signals attributed to POR which is one of paramagnetic defects are detected from SMF(2) after the exposure. It is conventionally believed that the hydrogen-proof characteristic deteriorates if POR is present in large numbers in an optical fiber. A problem, for example, has been so far pointed out that, when an optical fiber is exposed to hydrogen, the absorption loss at approximately 1520 nm occurs. Although the cause of generation of the absorption loss has not been made clear enough, it has been explained as, e.g., due to some interaction between PORs and hydrogen molecules (Nagasawa et al., JEOL News, Vol. 29, No. 2, 30 (1989)). Therefore, the hydrogen-proof characteristic has been believed to deteriorate when POR is present in an optical fiber.

However, it is not conventionally known that, when an optical fiber in which the original content of POR is less than the ESR measurement limit is exposed to hydrogen or deuterium to improve the hydrogen-proof characteristic, POR is anew generated, or increased after the exposure. The present invention takes effectively advantage of this phenomenon to improve the optical fiber characteristics.

Although this phenomenon has not been made clear enough, a hypothesis by the inventors will be recited below. When per-oxy linkages (POLs) are present in large numbers in an optical fiber, they react with hydrogen or deuterium as shown by the formula (4) or (5), and probably form an intermediate product (a substance enclosed in a square in the formula (4)) which deteriorates the transmission loss at approximately 1520 nm.

[Formula 1]

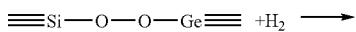

(4)

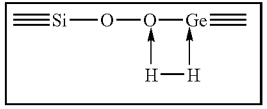

[Formula 2]

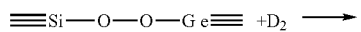

(5)

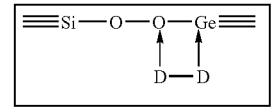

The transmission loss increase of the problem to be solved in the present invention is probably due to an intermediate product shown in the formula (5). The above reactions (4) or (5) progresses further, and forms POR as shown by the formulas (6) or (7).

[Formula 3]

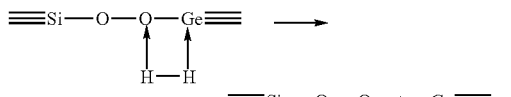

(6)

[Formula 4]

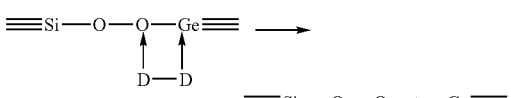

(7)

That is, SMF(2) of the example is solidified in the state that interatomic bonds broken in the drawing process are inhibited from rebonding by rapid cooling, and NBOHC and POL remain in large numbers. The POL probably reacts with hydrogen or deuterium as shown by the formulas (4) to (7).

SMF(2), even if its hydrogen-proof characteristic is improved by the deuterium treatment, presents an absorption, at a wavelength of approximately 1400 nm, of the intermediate products by the reactions shown by the formulas (5) and (7), which becomes a problem.

Consequently, when structural defects contained in an optical fiber after being exposed to hydrogen or deuterium are measured by ESR, the fabrication condition must be so optimized that the optical fiber has no detectable signal relevant to POR.

The gist of the present invention is to aim at an electron spin density of POR of not more than $1 \times 10^{13}$ spins/g, and to optimize the fabrication condition to obtain an optical fiber which does not deteriorate the transmission loss even by being exposed to deuterium.

There are many factors affecting the structure of the optical fiber glass, and different optimal fabrication conditions depending on the drawing conditions and the compositions and structures of the optical fiber preform. The optimization method is controlled, for example, by setting the drawing furnace temperature to be low and the drawing speed to be low for a slow cooling rate as described in the present specification.

Additionally, the use of the evaluation method of the present invention enables the fabrication of an optical fiber suitable for the transmission line of broad band WDM transmission, which optical fiber has; a cutoff wavelength $\lambda cc$ of 1310 nm or less; a transmission loss at wavelengths of 1310 to 1625 nm of 0.4 dB/km or less after the optical fiber is exposed to an atmosphere containing hydrogen of a partial pressure of approximately 0.01 atm, kept in the state of being exposed until the transmission loss at a wavelength of 1240 nm increases by 0.03 dB/km or more in comparison to that prior to the exposure, then taken out into the air, left for 14 or more days; and an electron spin density of POR of $1 \times 10^{13}$ spins/g or less when the outer periphery of the glass region of that optical fiber after being left is etched to the outer diameter of 50 μm with a diluted hydrofluoric acid, and the glass region is measured by ESR.

It is also found that the hydrogen or deuterium treatments lead to the observation of Ge(H)-E' or Ge(D)-E', and an optical fiber having a higher NBOHC density before the hydrogen or deuterium exposure forms Ge(H)-E' or Ge(D)-E' in larger numbers. In other words, whether the Ge(H)-E' or Ge(D)-E' is detected makes it possible to confirm whether or not hydrogen or deuterium is enough impregnated into the core layer containing Ge. The evaluation method for an optical fiber of the present invention also enables the evaluation of whether an optical fiber is treated to the state of having a sufficient hydrogen-proof characteristic.

Note that the identification of types of the structural defects by ESR according to the present invention employed methods described in: T. E. Tsai and D. L. Griscom, J. Non-Cryst. Solids 91, 170 (1987); K. Nagasawa, T. Fuji, Y. Ohki and Y. Hama, Jpn. J. Appl. Phys., Part 2 27, L240 (1988); G. Pacchioni and R. Ferrario, Phys. Pev. B58, 6090 (1998); Handbook of Chemistry and Physics (64th ed.; R. C. Weast, ed.); and Table of the Isotopes B-232, CRC Press (1983–1984). Here, the assignment of the ESR signal corresponding to Ge(H)-E' and Ge(D)-E' was confirmed by the conformity of a magnetic moment ratio of Si(H)-E' to Si(D)-E' (=2.7927/0.8574≈3.26) and a magnetic moment ratio of Ge(H)-E' to Ge(D)-E' (=119/37≈3.22) in a fine structure emerging in the vicinity of the signal corresponding to Ge-E'.

The examples described in the present specification are exemplifications to illustrate the present invention, and those skilled in the art will understand that various modified examples such as an optical fiber having a more complicated refractive index profile are included within the scope of the present invention.

The present invention provides an evaluation method for fabricating an optical fiber with a small increase in the transmission loss at the wavelength of approximately 1400 nm through the deuterium treatment. The optical fiber fabricated according to the present invention is also excellent in the hydrogen-proof characteristic and suitable for transmission lines of broad band WDM transmission.

What is claimed is:

1. An optical fiber comprising a core composed of a silica glass doped with at least germanium and a cladding composed of a silica glass surrounding the core,
    wherein after a processing that the optical fiber is exposed to an atmosphere containing hydrogen or deuterium to diffuse hydrogen molecules or deuterium molecules in the fiber and then the outer periphery of the glass region of the optical fiber is etched to an outer diameter of approximately 50 µm, an electron spin density of per-oxy radicals is $1 \times 10^{13}$ spins/g or less when the glass region is measured by the electron-spin resonance method.

2. The optical fiber according to claim 1, wherein after the outer periphery of the glass region of the optical fiber is etched to an outer diameter of approximately 50 µm with a diluted hydrofluoric acid, a signal corresponding to Ge(H)-E' or Ge(D)-E' is detected when the glass region is measured by the electron-spin resonance method.

3. The optical fiber according to claim 1,
    wherein a cutoff wavelength λcc is 1310 nm or less;
    after a processing that the optical fiber is exposed to an atmosphere containing hydrogen of a partial pressure of approximately 0.01 atm at room temperature, kept in the state of being exposed until the transmission loss at a wavelength of 1240 nm increases by 0.03 dB/km or more in comparison to that prior to the exposure, then taken out into the air and left for 14 or more days, a transmission loss at wavelengths of 1310 nm to 1625 nm is 0.40 dB/km or less; and
    after a processing that the outer periphery of the glass region of the optical fiber subjected to said hydrogen exposure, taken out in the air and left for 14 or more days is etched to an outer diameter of approximately 50 µm, an electron spin density of per-oxy radicals is $1 \times 10^{13}$ spins/g or less when the glass region is measured by the electron-spin resonance method.

4. The optical fiber according to claim 3, wherein after the outer periphery of the glass region of the optical fiber is etched to an outer diameter of approximately 50 µm with a diluted hydrofluoric acid, a signal corresponding to Ge(H)-E' or Ge(D)-E' is detected when the glass region is measured by the electron-spin resonance method.

5. A method of fabricating an optical fiber comprising the steps of
    preparing an optical fiber preform,
    drawing the optical fiber preform to form an optical fiber comprising a core composed of a silica glass doped with at least germanium and a cladding composed of a silica glass surrounding the core, and
    treating the optical fiber with hydrogen or deuterium by exposing the optical fiber to an atmosphere containing hydrogen or deuterium to diffuse hydrogen molecules or deuterium molecules in the optical fiber,
    wherein a cooling rate, a drawing furnace temperature and a drawing speed in the drawing step are selected such that an increase in the electron spin density of per-oxy radicals in the optical fiber measured by the electron-spin resonance method after the hydrogen treatment or the deuterium treatment in comparison to that before the hydrogen treatment or the deuterium treatment is $1 \times 10^{13}$ spins/g or less.

6. The method of fabricating an optical fiber according to claim 5, wherein the electron spin density is measured after the outer periphery of the glass region of the optical fiber is etched to an outer diameter of approximately 50 µm.

7. A method of evaluating a hydrogen-proof characteristic of an optical fiber obtained by drawing an optical fiber preform to form an optical fiber comprising a core composed of a silica glass doped with at least germanium and a cladding composed of a silica glass surrounding the core, and treating the optical fiber with hydrogen or deuterium to diffuse hydrogen molecules or deuterium molecules in the optical fiber by exposing the optical fiber to an atmosphere containing hydrogen or deuterium,
    wherein electron spin density of per-oxy radicals in the glass region of the optical fiber is measured before and after the hydrogen treatment or the deuterium treatment by the electron-spin resonance method, and the hydrogen resistance of the optical fiber is evaluated using an increased amount in the electron spin density of per-oxy radicals measured before the hydrogen treatment or the deuterium treatment in comparison to the electron spin density of per-oxy radicals measured after the hydrogen treatment or the deuterium treatment.

8. The method according to claim 7, wherein the electron spin density is measured after the outer periphery of the glass region of the optical fiber is etched to an outer diameter of approximately 50 µm.

9. The method according to claim 7, wherein the optical fiber is decided to have a sufficient hydrogen-proof characteristic when the increased amount in the electron spin density of per-oxy radicals is $1 \times 10^{13}$ spins/g or less.

* * * * *